United States Patent
Durant

(10) Patent No.: US 9,436,504 B2
(45) Date of Patent: Sep. 6, 2016

(54) TECHNIQUES FOR MANAGING THE EXECUTION ORDER OF MULTIPLE NESTED TASKS EXECUTING ON A PARALLEL PROCESSOR

(75) Inventor: Luke Durant, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 646 days.

(21) Appl. No.: 13/467,574

(22) Filed: May 9, 2012

(65) Prior Publication Data

US 2013/0305250 A1    Nov. 14, 2013

(51) Int. Cl.
*G06F 9/46* (2006.01)
*G06F 9/48* (2006.01)

(52) U.S. Cl.
CPC ....... *G06F 9/4881* (2013.01); *G06F 2209/483* (2013.01)

(58) Field of Classification Search
None
See application file for complete search history.

(56) References Cited

U.S. PATENT DOCUMENTS

| | | | |
|---|---|---|---|
| 5,553,293 A * | 9/1996 | Andrews et al. | 710/261 |
| 5,832,262 A * | 11/1998 | Johnson et al. | 718/102 |
| 5,924,098 A * | 7/1999 | Kluge | |
| 5,932,262 A | 8/1999 | Little | |
| 7,526,634 B1 * | 4/2009 | Duluk et al. | 712/216 |
| 8,069,446 B2 * | 11/2011 | Zhao et al. | 718/104 |
| 8,120,608 B2 * | 2/2012 | Jiao et al. | 345/426 |
| 8,411,734 B2 * | 4/2013 | Zhao et al. | 375/240 |
| 8,493,399 B1 * | 7/2013 | Bates et al. | 345/558 |
| 2008/0187053 A1 | 8/2008 | Zhao et al. | |

FOREIGN PATENT DOCUMENTS

TW    201120754 A    6/2011

* cited by examiner

*Primary Examiner* — Wissam Rashid
(74) *Attorney, Agent, or Firm* — Artegis Law Group, LLP

(57) ABSTRACT

One embodiment of the present disclosure sets forth an enhanced way for GPUs to queue new computational tasks into a task metadata descriptor queue (TMDQ). Specifically, memory for context data is pre-allocated when a new TMDQ is created. A new TMDQ may be integrated with an existing TMDQ, where computational tasks within that TMDQ include task from each of the original TMDQs. A scheduling operation is executed on completion of each computational task in order to preserve sequential execution of tasks without the use of atomic locking operations. One advantage of the disclosed technique is that GPUs are enabled to queue computational tasks within TMDQs, and also create an arbitrary number of new TMDQs to any arbitrary nesting level, without intervention by the CPU. Processing efficiency is enhanced where the GPU does not wait while the CPU creates and queues tasks.

21 Claims, 10 Drawing Sheets

TECHNIQUES FOR MANAGING THE EXECUTION ORDER OF MULTIPLE NESTED TASKS EXECUTING ON A PARALLEL PROCESSOR

BACKGROUND OF THE INVENTION

1. Field of the Invention

The present invention generally relates to computer architectures and, more specifically, to a method and system for managing nested execution streams.

2. Description of the Related Art

In conventional computing systems having both a central processing unit (CPU) and a graphics processing unit (GPU), the CPU determines which specific computational tasks are performed by the GPU and in what order. A GPU computational task typically comprises highly parallel, highly similar operations across a parallel dataset, such as an image or set of images. In a conventional GPU execution model, the CPU initiates a particular computational task by selecting a corresponding thread program and instructing the GPU to execute a set of parallel instances of the thread program. In the conventional GPU execution model, the CPU is usually the only entity that can initiate execution of a thread program on the GPU. After all thread instances complete execution, the GPU has to notify the CPU and wait for another computational task to be issued by the CPU. Notifying the CPU and waiting for the next computational task is typically a blocking, serialized operation that leaves certain resources within the GPU temporarily idle, thereby reducing overall system performance.

Performance may be improved in certain scenarios by queuing sequential computational tasks in a pushbuffer, from which the GPU may pull work for execution without waiting for the CPU. Computational tasks that include fixed data-flow processing pipelines benefit from this pushbuffer model when the CPU is able to generate work for the GPU quickly enough to have work pending within the pushbuffer whenever the GPU is able to start a new task. However, data-dependent computational tasks are still left with a sequential dependence between GPU results, CPU task management, and subsequent GPU task execution, which has to be launched by the CPU. One solution to this problem is to provide a mechanism for GPU thread programs to queue additional computational tasks without requiring intervention from the CPU, and wait for the completion of those computational tasks. However, there are several drawbacks to such an approach. First, CPUs conventionally have a means to dynamically allocate memory, but GPUs do not. When new computational tasks are launched by the GPU, the computational tasks are allocated memory to store context and parameter information accessed during the execution of the task. In such cases, the GPU engages the CPU to allocate memory for the new computational task. Then, the GPU waits for the CPU to allocate memory to the computational task prior to queuing the new task, thereby reducing performance.

Second, where both the CPU and GPU are able to launch new computational tasks into the pushbuffer, deadlock conditions may occur. The CPU may occupy all communication channels to the GPU for the purpose of queuing new computational tasks. The GPU may then queue a new computational task that accesses the CPU in order to complete. In such cases, the CPU is waiting on a GPU task to complete before releasing any of the communication channels, while the GPU task cannot complete until the task is granted access to the CPU via one of the blocked communication channels, resulting in deadlock.

Finally, queuing new computational tasks and pulling tasks from the pushbuffer for execution typically utilizes locking operations to ensure that tasks are executed sequentially and the information in the pushbuffer is properly preserved and managed. Although GPUs perform similar locking operations, locking operations are inherently slow. If the GPU employed locking operations while queuing new tasks, then system performance would be negatively impacted.

As the foregoing illustrates, what is needed in the art is a technique that allows GPUs to more efficiently queue work for execution.

SUMMARY OF THE INVENTION

One embodiment of the present invention sets forth a computer-implemented method for processing a plurality of tasks being executed by a first group of threads and stored within a plurality of task metadata descriptor queues (TMDQs). The method includes receiving a notification that a first task included in the plurality of tasks has completed, and determining within a co-processing unit whether all tasks included in a subset of the plurality of tasks and associated with a first TMDQ have executed. If all tasks included in the subset of the plurality of tasks have not executed, then the method further includes launching a second task included in the plurality of tasks. If all tasks included in the subset of the plurality of tasks have executed, then the method further includes updating a pointer in a first data structure associated with the first TMDQ, determining that a third task included in the plurality of tasks is about to be queued in the first TMDQ, and launching the third task.

One advantage of the disclosed technique is that GPUs are enabled to queue computational tasks within task queues and also create an arbitrary number of new task queues to any arbitrary nesting level, without intervention by the CPU. Processing efficiency is enhanced where the GPU does not wait while the CPU creates and queues tasks.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
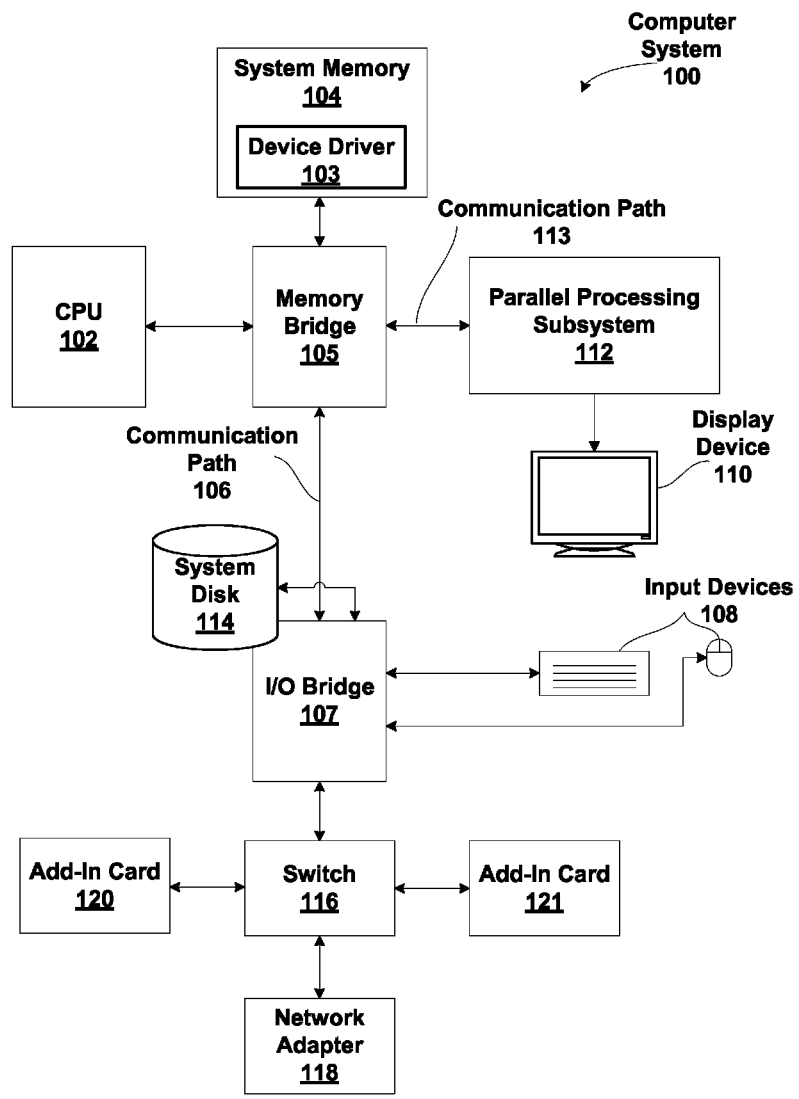
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
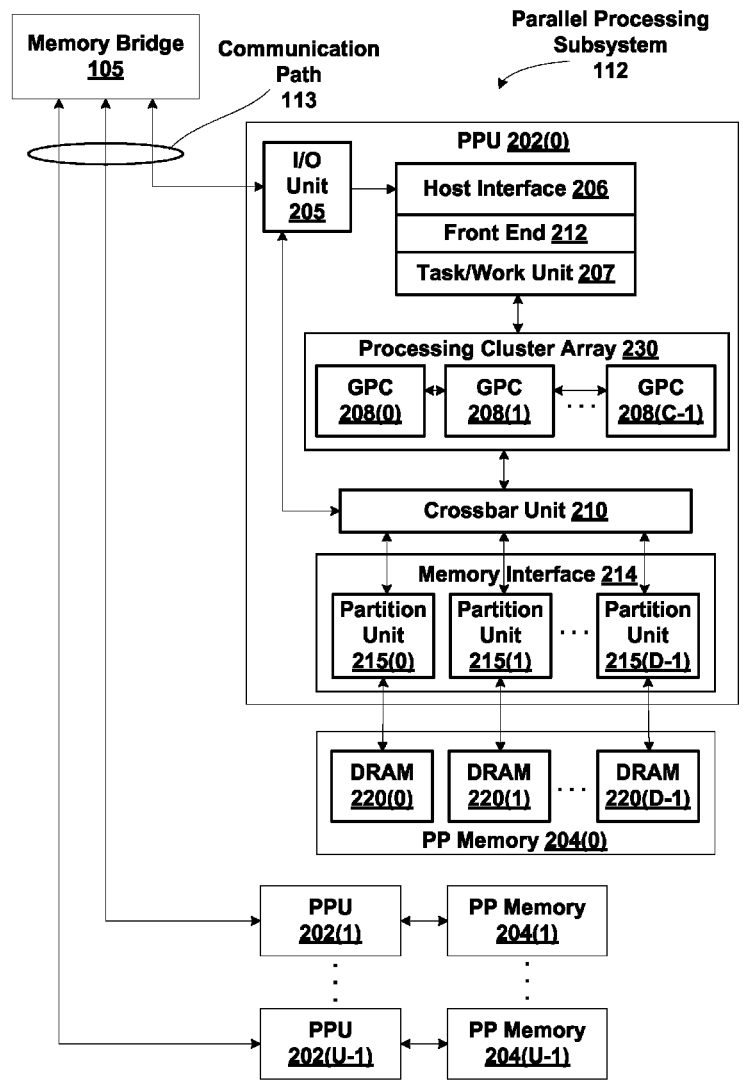
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
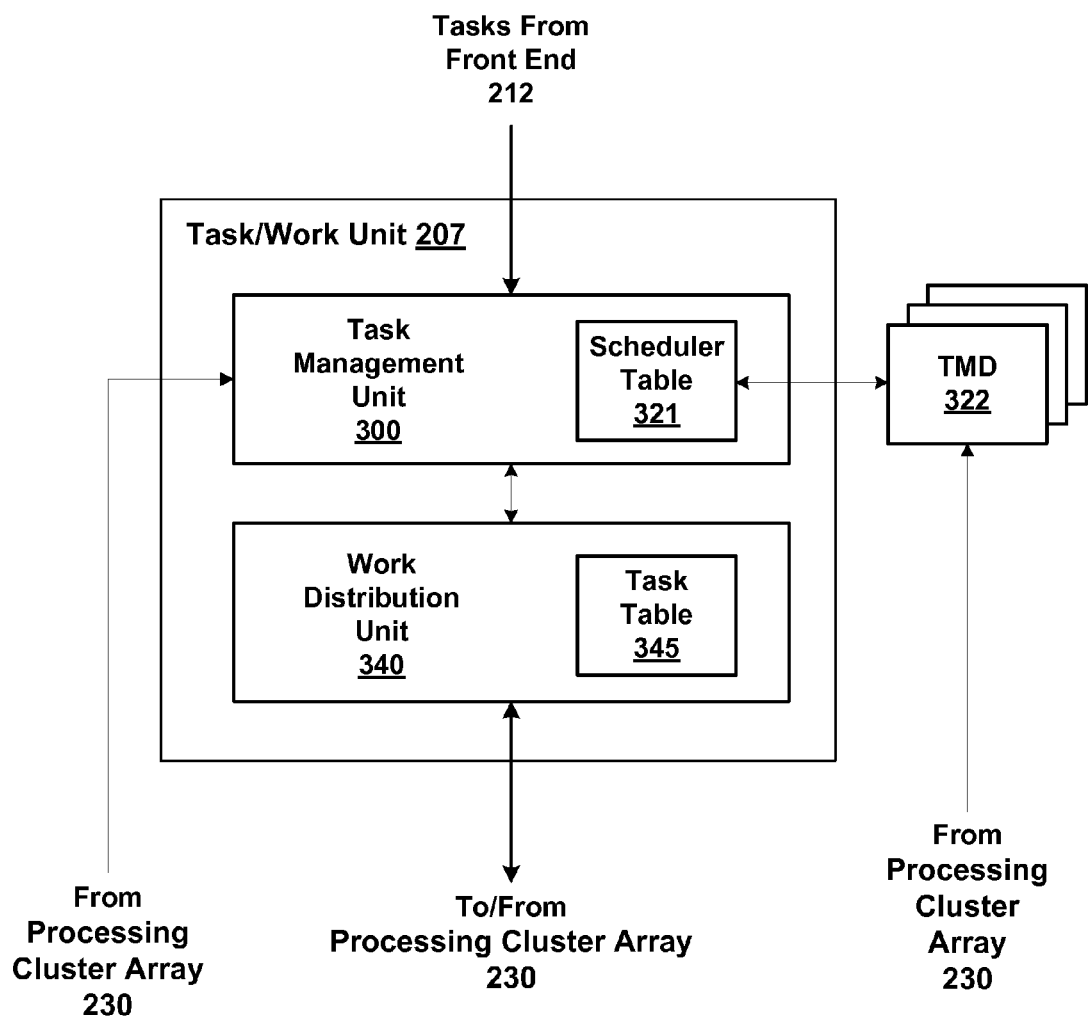
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task resumes at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
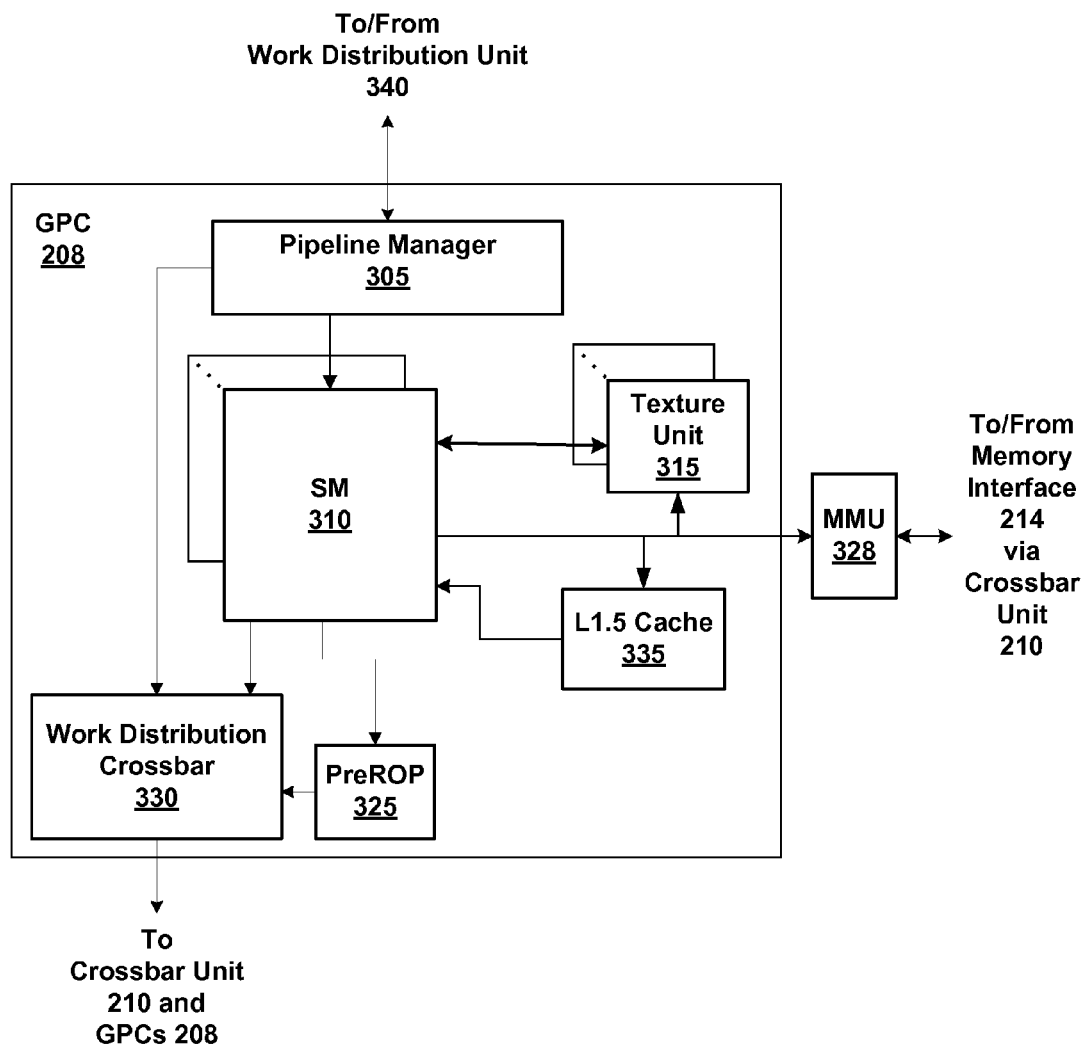
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines are idle during cycles when that thread group is being processed. A thread group may also include more threads than the number of processing engines within the SM 310, in which case processing takes place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 includes a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
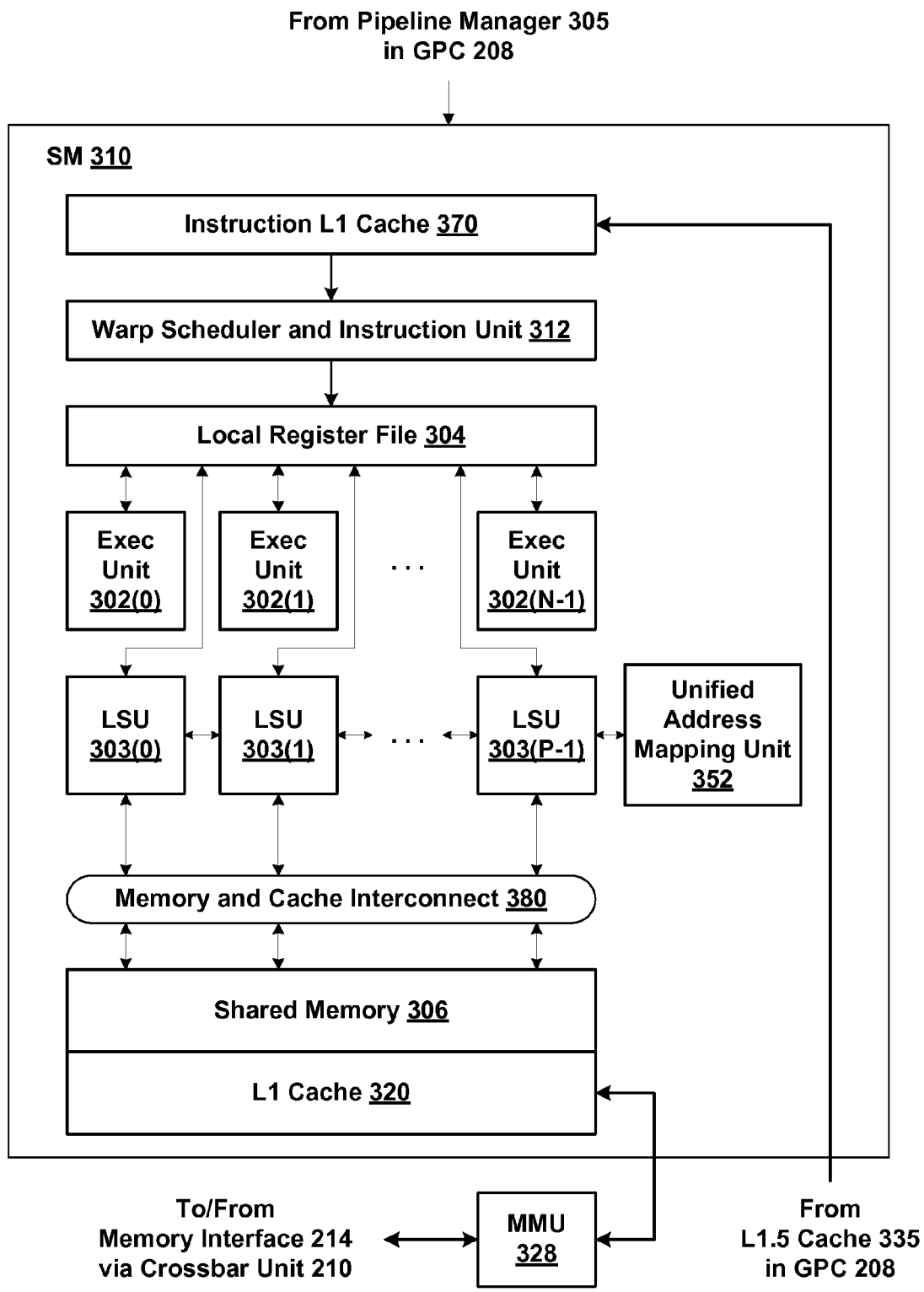
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data to be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Nested Execution Streams

Figure 4:
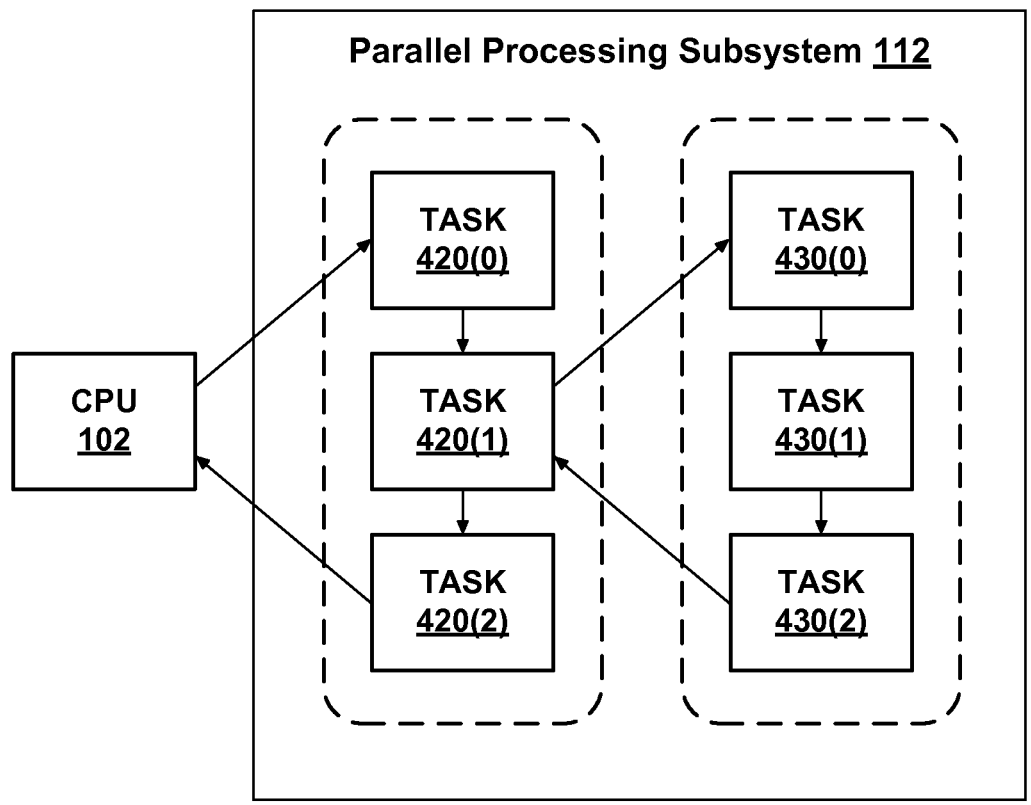
FIG. 4 illustrates nested task execution on a parallel processing subsystem, according to one embodiment of the present invention.

FIG. 4 illustrates nested task execution on parallel processing subsystem 112, according to one embodiment of the present invention. As shown, CPU 102 initiates execution of exemplary tasks 420 on parallel processing subsystem 112. After task 420(0) completes, task 420(1) executes. After task 420(1) completes, task 420(2) executes. During the course of execution, task 420(1) invokes tasks 430(0) through 430(2), for example, to compute an intermediate result used by task 420(1). To maintain proper instruction execution order, task 420(1) should wait until tasks 430 complete before continuing. To wait in this way, task 420(1) may block at a thread synchronization barrier on tasks 430. Each task 420, 430 may be performed by one or more threads, CTAs, or grids, as defined previously. Although parallel processing subsystem 112 is described herein as within the context of a graphics processing unit (GPU), the techniques described herein may be implemented in the context of any co-processing unit associated with the CPU 102.

In this example, task 420(1) is a parent of tasks 430, which are therefore children of task 420(1). While only one level of parent-child hierarchy is shown in FIG. 4, an arbitrary hierarchy may be implemented in practice. In one embodiment, tasks 420 and 430 each execute as at least one thread group, or at least one CTA within SM 310 of FIG. 3B. To enable thread programs having a parent and child relationship to execute on SM 310, three system elements should be implemented, including hardware functionality for parallel processing subsystem 112, software runtime functionality for parallel processing subsystem 112, and language support constructs for programming parallel processing subsystem 112.

The hardware functionality needed to support a parent thread launching a child thread, CTA, or grid within parallel processing subsystem 112 includes launching a new grid or CTA of work from a request generated by SM 310 and queued for execution to task/work unit 207, saving execution state for SM 310, continuing execution within SM 310 from the saved execution state, and facilitating memory coherence between a parent and child task. The runtime features needed to support a parent thread launching a child thread, CTA, or grid within processing subsystem 112 includes launching a new grid in response to a request from a thread executing within SM 310, enabling a parent thread to perform a thread synchronization barrier on a child thread group, ensuring memory coherence between the parent thread and the child group, scheduling work and continuation of synchronized thread groups for guaranteed forward computational progress, and ensuring proper execution semantics for parent threads and child groups. The language support constructs include a mechanism for specifying the launch of a child thread program from a parent thread, and executing a synchronization barrier on the child program.

Parallel processing subsystem 112 is programmed using a thread-oriented programming environment, such as the CUDA™ programming environment from NVIDIA™. In one embodiment, the CUDA language specification is expanded to include a child launch construct ("<<< >>>") to specify details for launching a child CUDA grid. The child launch construct, indicated herein as "A<<<B>>>C", includes a child program name (A), grid configuration parameters (B), and program input parameters (C). The CUDA runtime environment is expanded to enable a parent thread to perform a synchronization barrier on the child CUDA grid. Although the present discussion illustrates embodiments of the invention in the context of the CUDA programming environment, persons skilled in the art will recognize that the techniques taught herein are applicable to any parallel programming environment and any parallel processing system. As such, references to CUDA are for illustrative purposes only and are not intended to limit to scope or spirit of the present invention.

Table 1, below, illustrates use of the child launch construct and synchronization barrier in an exemplary CUDA program.

TABLE 1

```
__global__ void foo( )
{
    void *ptr = malloc(1024);
    A<<< 1, 1 >>>(ptr);    // child launch
    cudaThreadSynchronize( );   // sync barrier
    do_stuff(ptr);
}
```

In the example of Table 1, an instance of thread program "foo( )" launches a child grid using a thread program "A" with a pointer (*ptr) to memory allocated by foo( ). The allocated memory is accessible to threads within the child grid. The parent thread foo( ) is able to continue after child grid A completes, indicated by a return from a blocking synchronization barrier function call, herein named cudaThreadSynchronize( ).

Tasks launched onto the GPU are generally eligible to being begin execution immediately. Absent a mechanism to ensure sequential execution of tasks within a task queue, the parallel processing subsystem 112 schedules any task to begin execution without regard to dependencies on tasks previously launched into the same task queue. Sequential execution may be enforced by means of a hierarchical execution graph as described below.

Figure 5:
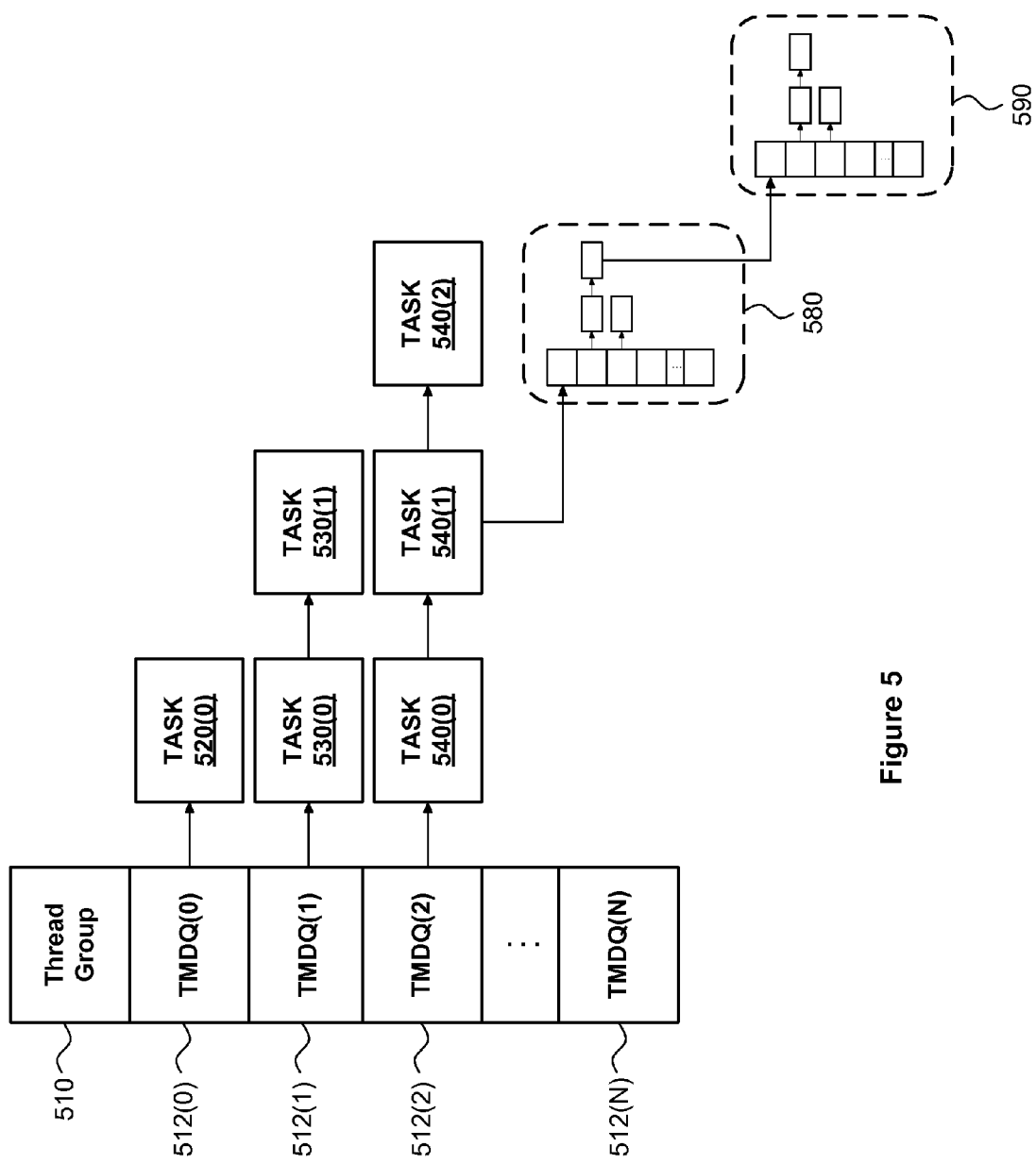
FIG. 5 illustrates a hierarchical execution graph including associated task metadata descriptor queues (TMDQs) and tasks, according to one embodiment of the present invention.

FIG. 5 illustrates a hierarchical execution graph including associated task metadata descriptor queues (TMDQs) and tasks, according to one embodiment of the present invention. As shown, the hierarchical execution graph includes thread group 510 at nesting depth 0, TMDQs 512, tasks 520 530 540, an execution graph 580 at nesting depth 1, and an execution graph 590 at nesting depth 2.

The thread group 510 at nesting depth 0 includes threads created and managed by the CPU 102. A thread group includes any set of threads, including a CTA, where all threads exist at the same nesting depth. The nesting depth of a thread is the number of parent grids above the level of the thread. For example, a CPU thread has a nesting depth of 0, because there are no parent grids above a CPU thread. If that CPU thread launches a grid, then that grid is said to be at nesting depth 1. If a thread in the grid at nesting depth 1 launches a new grid, then the new grid is said to be at nesting depth 2, and so forth. Because the threads in thread group 510 are CPU threads, each of these threads are at nesting depth 0.

TMDQs 512, as described above in conjunction with FIG. 2, include pointers to data structures known as tasks, as further described below. Each TMDQ 512 points to tasks belonging to one or more streams. TMDQ(0) 512(0) points to task 520(0) associated with a first stream. TMDQ(1) 512(1) points to tasks 530(0) and 530(1) associated with a second stream. TMDQ(2) 512(2) points to tasks 534(0), 540(1), and 540(2) associated with a third stream. Any number of TMDQs 512 may be defined where each TMDQ 512 includes an arbitrary number of tasks.

Tasks 520 530 540 are data structures that include one or more commands to be executed by the GPU. Tasks launched onto a given TMDQ 512 execute in sequential order. Task 530(0) completes before task 530(1) begins execution. Likewise, Task 540(0) completes before task 540(1) begins execution, which, in turn, completes before task 540(1) begins execution. A task at the front of a TMDQ 512 begins execution as soon as the task is launched. So, tasks 520(0), 530(0), and 540(0) execute as soon as those tasks are launched. Tasks in different TMDQs 512 have no sequential dependencies. For example, task 530(1) could execute either before, after, or concurrently with task 540(1).

Execution graph 580 at nesting depth 1 is a thread group, plus the associated TMDQs and tasks, that has been launched by one of the tasks at nesting depth 0. Any task may launch one or more grids, where such grids are at a nesting depth that is one greater than the nesting depth associated with the task that launched the grid. As shown, task 540(1), existing at nesting depth 0, launched execution graph 580 sometime during the execution of task 540(1). Each task and TMDQ within execution graph 580 functions essentially the same as tasks and TMDQs at nesting depth 0. When each task within execution graph 580 completes, and all other commands in task 540(1) have completed, then task 540(2) may begin execution.

Execution graph 590 at nesting depth 2 is a thread group plus associated TMDQs and tasks, that has been launched by one of the tasks at nesting depth 1. Each task and TMDQ within execution graph 590 functions essentially the same as tasks and TMDQs at lower nesting levels. When each task within execution graph 590 completes, then the launching task may complete once all other commands in the launching task have completed. In this manner, sequential execution is preserved within any grid, and grids may be nested to an arbitrary nesting depth while preserving sequential execution of tasks within a stream.

Threads within a thread group are defined in terms of a context, where the context is the set of threads that have access to the same stream and TMDQ resources. Threads within the same context may create and share TMDQs, so long as the threads are at the same nesting depth and on the same device (GPU, or CPU 102). For CPU threads, the context is defined as the set of threads associated with the CUDA context. For GPU threads, the context may represent a Cooperative Thread Array (CTA) or any set of threads that exist at the same nesting depth.

When a new stream is created by a CPU thread, the CPU 102 dynamically allocates memory to support management of the stream. When the stream is subsequently destroyed after the completion of the streams tasks, the CPU 102 frees the memory previously allocated for the stream. The GPU typically is not able to dynamically allocate memory. Therefore, the GPU pre-allocates context data for each context that may simultaneously execute. As a result, a thread group associated with a GPU grid has a fixed number of TMDQs that may not change during the execution of the grid. A new stream within a GPU grid is created with the cudaStreamCreate( ) function call. The function call returns an integer index pointing to one of the pre-allocated TMDQs in the grid. No dynamic allocation of memory is needed to create the stream. Once all tasks within a GPU stream have completed, the stream is destroyed with a cudaStreamDestroy( ) function call. Because no memory was dynamically allocated for the GPU stream, cudaStreamDestroy( ) the function call has no memory to place back into the free pool and therefore simply returns back to the calling program.

Once a stream has been created, new tasks are launched into the stream by one or more threads in the associated context. If a thread launches a new task into a TMDQ that currently has no tasks, then the new task begins execution immediately after the task is launched. Likewise, if all previous tasks in a TMDQ have completed execution, then a new task launched into a TMDQ begins execution immediately after the task is launched. Alternatively, if a thread launches a new task into a TMDQ that has one or more pending tasks that have not completed execution, the new task is launched into the TMDQ, but the task does not begin execution until the pending prior tasks complete execution. In either case, the new task is launched into the TMDQ via non-locking operations requiring no intervention from the CPU 102.

Figure 6:
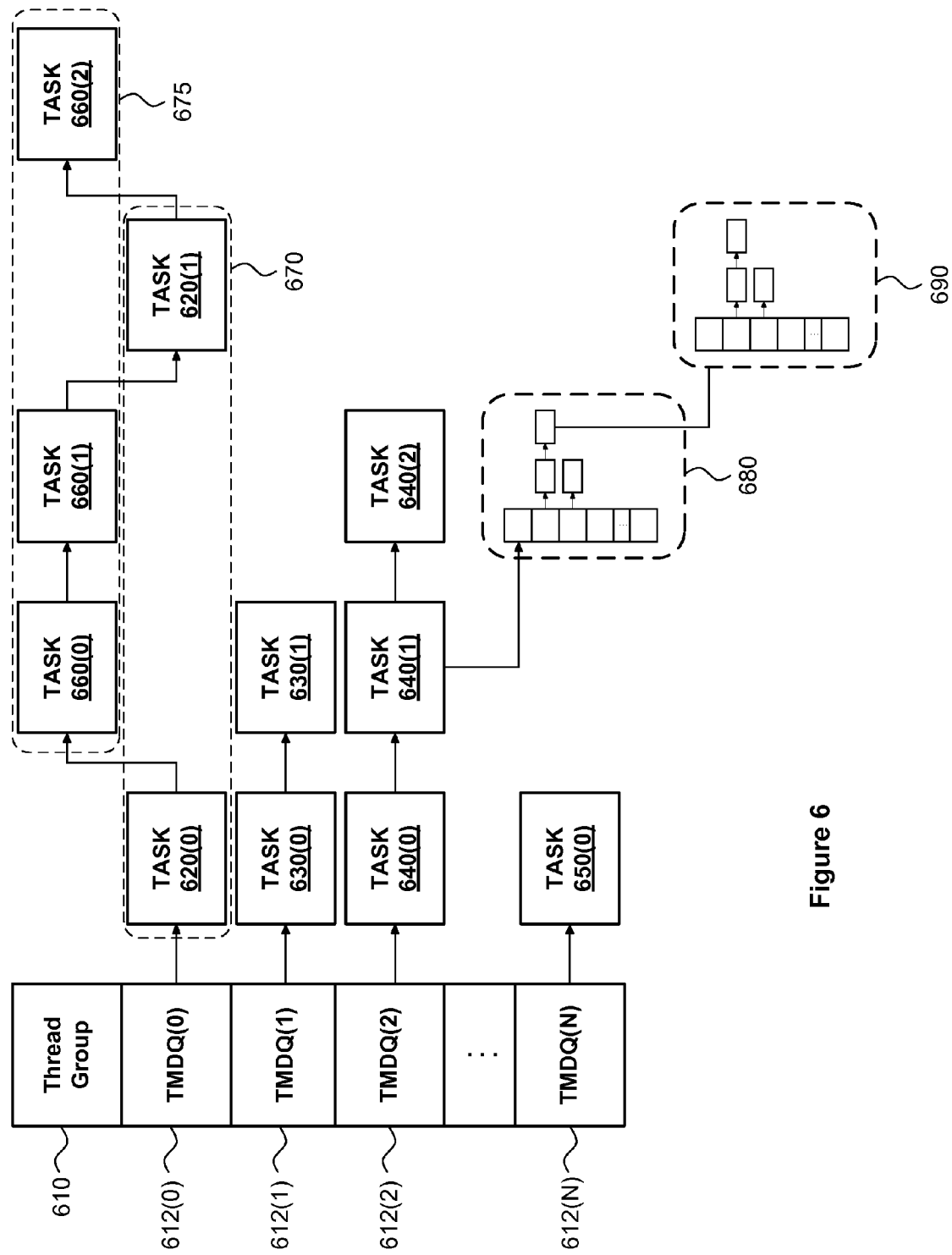
FIG. 6 illustrates a hierarchical execution graph including associated TMDQs and tasks, according to another embodiment of the present invention.

FIG. 6 illustrates a hierarchical execution graph including associated TMDQs and tasks, according to another embodiment of the present invention. As shown, the hierarchical execution graph includes thread group 610 at nesting depth 1, TMDQs 612, tasks 620 630 640 650 660, an execution graph 680 at nesting depth 2, and an execution graph 690 at nesting depth 3. The components of the hierarchical execution graph function substantially as described above in conjunction with FIG. 5 except as detailed below.

As shown, each TMDQ 612 of thread group 610 has one or more pending tasks. In one example, task 620(0) associated with stream 670 could have been launched into TMDQ 612(0), but task 660(0) associated with stream 675 would not yet have been launched. Tasks 630 associated with one stream could have been launched into TMDQ( ) 612(1). Likewise, tasks 640 associated with a second stream could have been launched into TMDQ(2) 612(2), tasks 650 associated with a third stream could have been launched into TMDQ(N) 612(N), and all intervening TMDQs 612 could also have one or more associated tasks. At such a time, a thread within thread group 610 could attempt to create a new stream 675. However, the thread group 610 has a nesting depth of 1, and is associated with the GPU. Because the GPU is not able to dynamically allocate memory, a new TMDQ could not be created to accommodate the new stream 675. In such a case, tasks 660 associated with the new stream 675 could be launched into TMDQ(0) currently being used by stream 670. Stream 675 could launch tasks 660(0) and 660(1) into TMDQ(0) 612(0). Stream 670 could then launch task 620(1) into TMDQ(0) 612(0). Stream 675 could then launch task 660(2) into TMDQ(0) 612(0). Note that this approach results in unneeded dependencies. Even though streams 670 and 675 are independent of each other, the sequential nature of TMDQs results in task 660(0) depending on completion of task 620(0), task 620(1) depending on completion of task 660(1), and so on. While performance could decrease as a result, sequential ordering of tasks 620 in stream 670 and tasks 660 in stream 675 is properly preserved.

Figure 7:
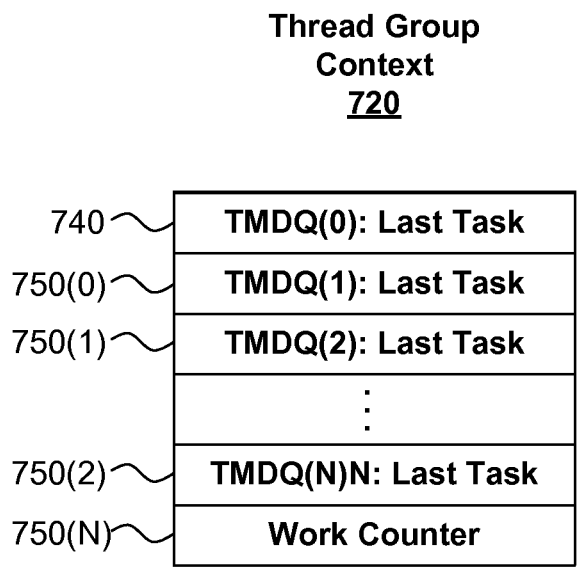
FIG. 7 illustrates a thread group context data structure including parameters and context information associated with a thread group, according to one embodiment of the present invention.

FIG. 7 illustrates a thread group context 720 data structure including parameters and context information associated with a thread group, according to one embodiment of the present invention. As shown, the thread group context 720 includes a last task pointer 740 for each TMDQ in the thread group, and a work counter 750.

The last task pointer 740 is a pointer to the last task in the associated TMDQ. When a new task is launched into a TMDQ, the last task pointer 740 is updated via an atomic operation to indicate the new task is now the last task in the TMDQ. Table 2, below, illustrates launching a new task in a TMDQ in an exemplary CUDA program.

TABLE 2

```
formerStreamEnd = atomicExchange(&streamEnd, newTask);
if (formerStreamEnd) {
    formerStreamEnd->streamNext = newTask;
} else {
    LaunchTask(newTask);
}
```

In the example of Table 2, the last task pointer 740 at address StreamEnd is overwritten with a pointer to NewTask, and the prior value in the last task pointer 740 is returned as FormerStreamEnd. If FormerStreamEnd is non-zero (that is, FormerStreamEnd is a pointer to a task), then the StreamNext value associated with the task is updated to point to the newly launched tasks. If FormerStreamEnd is zero, then no tasks are pending in the TMDQ, and the new task may begin execution immediately.

The example of Table 2 executes within a critical section of operation so as to avoid deadlock where a thread has posted a task into a stream, but then the thread has been swapped out before launching the new task. In such a case, deadlock may occur if the swapped out thread is not allowed to be swapped back until the new task has completed. However, the new task may not begin execution because the new task has not yet been launched.

When a task completes, a scheduler executing on parallel processing subsystem 112 reads the last stream pointer corresponding to the TMDQ associated with the completed task. If the last task pointer 740 of the associated TMDQ does not point to the completed task, then the completed task is not the last task in the TMDQ. In such a case, the scheduler causes the next task in the TMDQ to begin execution, as described below in conjunction with FIG. 8. If the last task pointer 740 of the associated TMDQ points to the completed task, then the completed task is the last task in the TMDQ. In such a case, the scheduler performs an atomic compare and swap to set the last task pointer 740 to a null pointer and read the value currently stored in the last task point 740. The scheduler performs a function call in the form of "currentEnd=atomicCAS(&StreamEnd, finishedTask, NULL)," where "StreamEnd" is the last task pointer 740 of the associated TMDQ, "finishedTask" is a pointer to the completed task, and "NULL" is the null pointer. The function atomically returns the value stored in the last task pointer 740, as represented by "currentEnd" in the function call.

If the value of "currentEnd" is a pointer to the completed task, then all tasks in the TMDQ have completed, and no new task has been launched. The scheduler knows that all tasks in the stream have completed. If the value of "currentEnd" is not a pointer to the completed task, then a new task has been launched, and the thread group context 720 has been updated to reflect the existence of the new task. In such a case, the scheduler reads the StreamNext pointer (described below) associated with the completed task. If the StreamNext pointer associated with the completed task is non-zero, then the scheduler causes the task at address StreamNext to begin execution. If the value of StreamNext is the null pointer, then a new task has been launched, but the task status has not yet been updated to reflect the existence of the new task. In such a case, the scheduler monitors StreamNext until the value changes from the null pointer to a pointer to the new task. The scheduler then causes the new task pointed to by StreamNext to begin execution.

Figure 8:
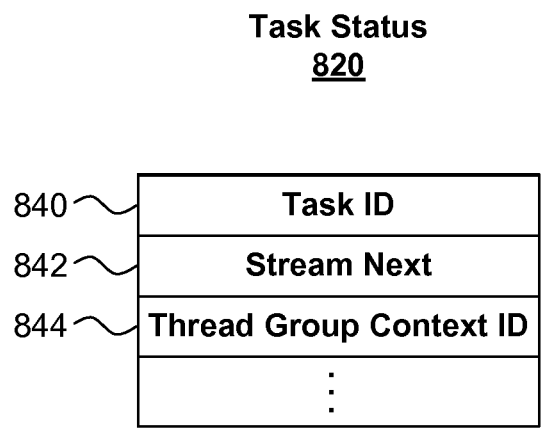
FIG. 8 illustrates a task status data structure including parameters associated with a computational task, according to one embodiment of the present invention.

FIG. 8 illustrates a task status 820 data structure including parameters associated with a computational task, according to one embodiment of the present invention. As shown, the task status 820 includes a task identifier (task ID) 840, a stream next pointer 842, a thread group context identifier (thread group context ID) 844, and other parameters associated with the task (not shown).

The task ID 840 is a unique identifier pointing to the task associated with the task status 820. A task status 820 is created for each new task as tasks are created and launched on a TMDQ. The task ID enables the scheduler to find the task associated with a given task status 820.

The stream next pointer 842 is a pointer to the next task in the TMDQ. When a task completes, the scheduler reads the next stream pointer to determine where to find the next task in the TMDQ that may begin execution. The scheduler then causes the task located at the address pointed to by the stream next pointer 842 to begin execution. If the completed task is the last task in the TMDQ, then the stream next pointer 842 is set to a null pointer.

The thread group context ID 820 is a unique identifier pointing to the thread group context 720 associated with the task status 820. When a task completes, the scheduler reads the thread group context ID 820 to find the thread group context 720. The scheduler can then perform associated task completion steps, such as updating the work counter closing a TMDQ, and closing a context, as described above in association with FIG. 7.

Persons skilled in the art will recognize that the techniques described herein are illustrative only and that variations and modifications are possible. For example, the described techniques are sufficiently flexible to be employed in any parallel programming environment and any parallel processing system, regardless of whether a GPU or other co-processor associated with such an environment or system may dynamically allocate memory. As such, the described techniques may be employed whether the GPU pre-allocates memory associated with a TMDQ, or dynamically allocates memory to a TMDQ as needed.

Figure 9:
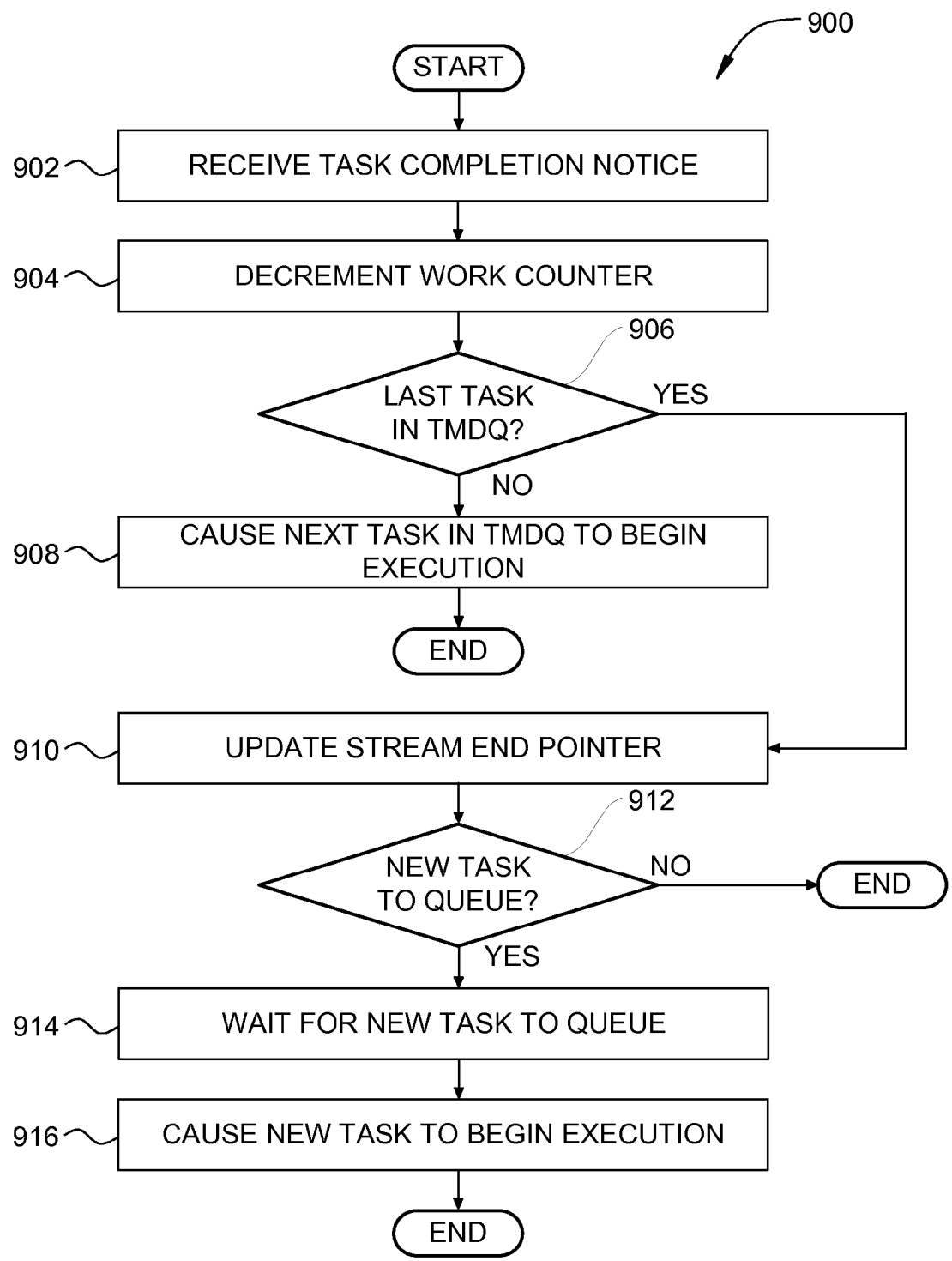
FIG. 9 is a flow diagram of method steps for handling a completed computational task, according to one embodiment of the present invention.

FIG. 9 is a flow diagram of method steps for handling a completed computational task, according to one embodiment of the present invention. Although the method steps are described in conjunction with the systems of FIGS. 1-8, persons of ordinary skill in the art will understand that any system configured to perform the method steps, in any order, is within the scope of the present invention.

The method 900 begins at step 902, where the scheduler receives notice that a computational task has completed. At step 902, the scheduler decrements a work counter associated with the thread group to which the completed task belongs. At step 906, the scheduler determines whether the completed task is the last task in the associated TMDQ, that is, all tasks in the associated TMDQ associated have completed. For example, the scheduler could determine that the completed task is the last task in the TMDQ if the stream end pointer associated with the TMDQ points to the completed task. If the completed task is not the last task in the TMDQ, then the method 900 proceeds to step 908, where the scheduler causes the next task in the TMDQ to begin execution. The method 900 then terminates.

If, at step 906, the completed task is the last task in the TMDQ, then the method 900 proceeds to step 910, where the scheduler updates the stream end pointer associated with the TMDQ to a null pointer using an atomic operation, reflecting that the TMDQ is now empty. At step 912, the scheduler determines whether either the CPU 102 or the thread group has just launched a new task to the queue. For example, the scheduler could determine that, when atomically updating the stream end point to a null pointer, the pointer has been changed to no longer point to the completed task. If the CPU 102 or thread group has not launched a new task, then the method 900 terminates.

If, at step 912, the CPU 102 or thread group has launched a new task, then the method 900 proceeds to step 914, where the scheduler waits for the new task to be queued in the TMDQ. For example, the scheduler could wait for the stream end pointer associated with the TMDQ to be updated to point to the new task. At step 916, the scheduler causes the new task to begin execution. The method 900 then terminates.

In sum, the disclosed technique provides an enhanced way for GPUs to queue new computational tasks into TMDQs. Specifically, memory for context data is preallocated when a new TMDQ is created, where the memory includes data space for each context that may be separately executing on the GPU. When a new TMDQ is created, and the CTA context has no available entries for a new TMDQ, the new TMDQ may be integrated with an existing TMDQ, where computational tasks within that TMDQ include task from each of the original TMDQs. New computational tasks queued into the TMDQ may execute immediately or may wait for prior tasks within the TMDQ to complete. A scheduling operation is executed on completion of each computational task in order to preserve sequential execution of tasks without the use of atomic locking operations.

Advantageously, the disclosed technique enables GPUs to queue computational tasks within task queues, and also create an arbitrary number of new task queues to any arbitrary nesting level, without intervention by the CPU. Processing efficiency is enhanced where the GPU does not wait while the CPU creates and queues tasks. Because the GPU does not need intervention from the CPU, deadlock is avoided even where the CPU consumes all communication channels to the GPU. Sequential execution of computational tasks is preserved for tasks launched by both the CPU and GPU.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

What is claimed is:

1. A computer-implemented method for processing a plurality of tasks being executed by a first group of threads and stored within a plurality of task metadata descriptor queues (TMDQs), the method comprising:
    receiving a notification that a first task included in the plurality of tasks has completed;
    determining within a co-processing unit whether all tasks included in a subset of the plurality of tasks and associated with a first TMDQ have executed;
    if all tasks included in the subset of the plurality of tasks have not executed, then launching a second task included in the plurality of tasks; and
    if all tasks included in the subset of the plurality of tasks have executed, then:
        updating a pointer in a first data structure associated with the first TMDQ;
        determining that a third task included in the plurality of tasks is about to be queued in the first TMDQ; and
        executing the third task.

2. The method of claim 1, further comprising decrementing a counter related to a quantity of uncompleted tasks included in the plurality of tasks after receiving the notification that the first task has completed.

3. The method of claim 2, further comprising determining that all tasks being executed by the first group of threads have completed based on the counter having a value of zero.

4. The method of claim 1, wherein executing the third task further comprises waiting for a memory location within a second data structure associated with the third task to be updated to reflect where the third task is located.

5. The method of claim 1, wherein the first TMDQ has been created at the request of a task generated prior to the first task and associated with a second group of threads.

6. The method of claim 1, wherein the first task was inserted into the first TMDQ by a task generated prior to the first task and associated with a second group of threads.

7. The method of claim 1, wherein the first TMDQ includes a first set of tasks corresponding to a first thread included in the first group of threads, and a second TMDQ includes a second set of tasks corresponding to a second thread included in the first group of threads.

8. The method of claim 1, wherein the first TMDQ includes a first set of tasks corresponding to a first thread included in the first group of threads and a second set of tasks corresponding to a second thread included in the first group of threads.

9. The method of claim 1, wherein determining whether all tasks included in the subset of the plurality of tasks have executed comprises determining whether a pointer to a last task stored in the first TMDQ points to the first task.

10. The method of claim 9, wherein determining whether the pointer to the last task stored in the first TMDQ points to the last task comprises performing an atomic operation.

11. The computer-implemented method of claim 1, wherein determining that a third task included in the plurality of tasks is about to be queued in the first TMDQ comprises:
    determining that a first pointer does not point to a completed task; and
    determining that a second pointer is null.

12. A subsystem for processing a plurality of tasks being executed by a first group of threads and stored within a plurality of task metadata descriptor queues (TMDQs), comprising:
    a task management unit configured to perform the steps of:
        receiving a notification that a first task included in the plurality of tasks has completed;
        determining within a co-processing unit whether all tasks included in a subset of the plurality of tasks and associated with a first TMDQ have executed;
        if all tasks included in the subset of the plurality of tasks have not executed, then launching a second task included in the plurality of tasks; and
        if all tasks included in the subset of the plurality of tasks have executed, then:
            updating a pointer in a first data structure associated with the first TMDQ;
            determining that a third task included in the plurality of tasks is about to be queued in the first TMDQ; and
            executing the third task.

13. The subsystem of claim 12, further comprising decrementing a counter related to a quantity of uncompleted tasks included in the plurality of tasks after receiving the notification that the first task has completed.

14. The subsystem of claim 13, further comprising determining that all tasks being executed by the first group of threads have completed based on the counter having a value of zero.

15. The subsystem of claim 12, wherein executing the third task further comprises waiting for a memory location within a second data structure associated with the third task to be updated to reflect where the third task is located.

16. The subsystem of claim 12, wherein the first TMDQ has been created at the request of a task generated prior to the first task and associated with a second group of threads.

17. The subsystem of claim 12, wherein the first task was inserted into the first TMDQ by a task generated prior to the first task and associated with a second group of threads.

18. The subsystem of claim 12, wherein the first TMDQ includes a first set of tasks corresponding to a first thread included in the first group of threads, and a second TMDQ includes a second set of tasks corresponding to a second thread included in the first group of threads.

19. The subsystem of claim 12, wherein the first TMDQ includes a first set of tasks corresponding to a first thread included in the first group of threads and a second set of tasks corresponding to a second thread included in the first group of threads.

20. The subsystem of claim 12, wherein determining whether all tasks included in the subset of the plurality of tasks have executed comprises determining whether a pointer to a last task stored in the first TMDQ points to the first task.

21. A computing device, comprising:
 a task management unit configured to process a plurality of tasks being executed by a first group of threads and stored within a plurality of task metadata descriptor queues (TMDQs) by performing the steps of:
  receiving a notification that a first task included in the plurality of tasks has completed;
  determining within a co-processing unit whether all tasks included in a subset of the plurality of tasks and associated with a first TMDQ have executed;
  if all tasks included in the subset of the plurality of tasks have not executed, then launching a second task included in the plurality of tasks; and
  if all tasks included in the subset of the plurality of tasks have executed, then:
   updating a pointer in a first data structure associated with the first TMDQ;
   determining that a third task included in the plurality of tasks is about to be queued in the first TMDQ; and
   executing the third task.

\* \* \* \* \*